United States Patent [19]

Bedell

[11] Patent Number: 5,096,691
[45] Date of Patent: * Mar. 17, 1992

[54] H2S ABATEMENT WITH STABILIZED CHELATES IN GEOTHERMAL DRILLING

[76] Inventor: Stephen A. Bedell, 105 Strawberry, Lake Jackson, Tex. 77566

[*] Notice: The portion of the term of this patent subsequent to Jan. 2, 2007 has been disclaimed.

[21] Appl. No.: 295,311

[22] Filed: Jan. 9, 1989

Related U.S. Application Data

[63] Continuation-in-part of Ser. No. 831,969, Feb. 24, 1986, abandoned.

[51] Int. Cl.⁵ .............................................. C01B 17/05
[52] U.S. Cl. ................................. 423/576.6; 252/191
[58] Field of Search ........................... 423/220, 576.6; 252/189, 190, 191, 192; 556/2.6

[56] References Cited

U.S. PATENT DOCUMENTS

| | | | |
|---|---|---|---|
| 3,622,273 | 11/1971 | Roberts | 423/226 |
| 3,859,414 | 1/1975 | Urban | 423/222 |
| 3,937,795 | 2/1976 | Hasebe | 423/226 |
| 3,956,473 | 5/1976 | Mimoun | 423/226 |
| 4,002,727 | 1/1977 | Sonoda | 423/226 |
| 4,009,251 | 2/1977 | Meuly | 423/226 |
| 4,083,945 | 4/1978 | Fenton | 423/226 |
| 4,189,462 | 2/1980 | Thompson | 423/226 |
| 4,206,194 | 6/1980 | Fenton | 423/226 |
| 4,220,505 | 9/1980 | Deem | 423/220 |
| 4,243,648 | 1/1981 | Fenton | 423/571 |
| 4,382,918 | 5/1983 | Diaz | 423/226 |
| 4,388,293 | 6/1983 | Diaz | 423/226 |
| 4,400,368 | 8/1983 | Diaz | 423/228 |
| 4,421,733 | 12/1983 | Blytas | 423/226 |
| 4,432,962 | 2/1984 | Gowdy | 423/224 |
| 4,455,287 | 6/1984 | Primack | 423/226 |
| 4,461,754 | 7/1984 | Diaz | 423/226 |
| 4,468,929 | 9/1984 | Jernigan | 423/573.1 |
| 4,532,116 | 7/1985 | Doerges | 423/226 |
| 4,541,998 | 9/1985 | Weber | 423/226 |
| 4,622,212 | 11/1986 | McManus | 423/226 |
| 4,629,608 | 12/1986 | Lampton, Jr. | 423/226 |
| 4,696,802 | 9/1987 | Bedell | 423/226 |
| 4,891,205 | 1/1990 | Bedell | 423/220 |

FOREIGN PATENT DOCUMENTS 734577 8/1955 United Kingdom ................ 423/222

OTHER PUBLICATIONS

CRC Handbook of Chemistry and Physics, 62nd ed. Weast et al., eds. CRC Press, Inc. 1981, p. D-142.

Primary Examiner—Jeffrey E. Russel

[57] ABSTRACT

H2S abatement in geothermal drilling operations (e.g. drilling, flow testing and reworking) with a ferric aminocarboxylic acid chelating solution containing a stabilizer and an optional cationic polyelectrolyte catalyst which is injected in the blooie line of the well upstream of the separator. The stabilizer is a hydroxyl radical scavenger such as iodide, nitrite, amino acid, aliphatic aldehyde, sugar, ascorbate, formate and/or aryl sulfonic acid, and inhibits degradation the ferric aminocarboxylic acid complex.

32 Claims, 1 Drawing Sheet

H$_2$S ABATEMENT WITH STABILIZED CHELATES IN GEOTHERMAL DRILLING

CROSS-REFERENCE TO RELATED APPLICATION

This is a continuation-in-part of U.S. Ser. No. 06,831,969, filed Feb. 24, 1986, now U.S. Pat. No. 4,891,205, and incorporated herein by reference.

BACKGROUND OF THE INVENTION

The invention relates to a method for drilling geothermal wells whereby the raw steam produced is treated with ferric chelates to remove substantially all of the hydrogen sulfide gas contained therein. The invention also relates to a stabilized ferric chelation system, and particularly to the use of stabilizers that increase the life of the iron chelating agents in removing hydrogen sulfide from geothermal steam produced during drilling operations.

Geothermal steam wells are drilled with compressed air as the motive force for the drill bit. Due to the high temperatures encountered and the highly fractured nature of the reservoirs, drilling mud is not an option. As the drilling enters steam producing areas, the air and steam escape through the casing into a blooie line and muffler. The stringent air pollution standards require that the H$_2$S in the steam be abated.

Once a well is completed, a flow test is performed. A flow test consists of opening the well full bore and letting it blow through the blooie line. It is during this period that a majority of the need for H$_2$S abatement occurs. These flow tests last from 30 up to 90 days depending on the experience with the reservoir.

Once wells are in production, they tend to foul as a result of the impurities present in the steam. Eventually, production will drop off and reworking of the well is necessary. Reworking involves bringing a rig in and drilling deeper into another steam producing zone or widening the bore. Again, H$_2$S abatement is necessary. As an area of steam production is reached, the well is again flow tested. The flow test at this point is much less, from 15 to 30 days. Generally, H$_2$S abatement requirements for a reworked well are about half that of a new well.

It is known from U.S. Pat. No. 4,151,260 that H$_2$S gases contained in steam can be abated during the drilling of geothermal wells by treating the steam with an alkaline solution of hydrogen peroxide.

The use of iron chelates to treat exhaust geothermal steam from a steam turbine is taught in U.S. Pat. Nos. 4,414,817 and 4,468,929.

It is known from U.S. Pat. No. 4,629,608 that cationic polymeric catalysts are useful to accelerate the oxidation of H$_2$S with iron chelates in exhaust steam from geothermal power plants. It is disclosed in U.S. Pat. No. 4,696,802 to treat steam released during geothermal well drilling with an aqueous solution of ferric chelate and a water soluble cationic polymeric catalyst to remove hydrogen sulfide therefrom.

It is known from U.S. Pat. No. 4,009,251 to use a metal chelate catalyst solution for hydrogen sulfide removal which contains a salt of a non-oxidizing acid having a pK of 1.2–6, such as formic and benzoic acids, to inhibit the formation of acidic sulfur oxides and accelerate the reaction of hydrogen sulfide to form sulfur.

The Stretford process is a well-known method for removing hydrogen sulfide from gas streams. Typically, the Stretford process uses a solution containing quinone sulfonate catalyst, a polyvalent metal, usually vanadium, and a carboxylate. The quinone is generally required in such systems to solubilize the polyvalent metal and/or the polyvalent metal carboxylate complex. As far as applicant is aware, however, such solubilizers are not required in systems employing polyamino carboxylate chelating agents. Exemplary references descriptive of the Stretford process include U.S. Pat. Nos. 4,009,251; 4,243,648; and 3,937,795.

It is also known from U.K. Patent No. 734,577 to employ aromatic compounds as solvents for absorption of hydrogen sulfide in absorption-stripping operations. Such compounds in this system function only as solvents, and not as catalysts or reactants as no chemical reaction of the hydrogen sulfide normally occurs.

It is known from U.S. Pat. No. 3,956,473 to remove hydrogen sulfide with an organic solvent containing a chelate and/or a transition metal salt in which one of the anions may be bromide. The bromide generally serves no known function in the chelating solution, other than as an anion in stoichiometric amounts to provide the metal as a salt in a soluble form.

It is known from U.S. Pat. No. 4,220,505 to use trihalides(I) to oxidize hydrogen sulfide to elemental sulfur while reducing the trihalide(I) to a zero valent state. The zero valent halide is electrolytically oxidized and thus regenerated for reuse.

It is known from U.S. Pat. No. 4,206,194 that cyanides are formed in the presence of ferrous ions, and that such cyanides destroy anthraquinone disulfonate which is commonly used in the Stretford process.

SUMMARY OF THE INVENTION

The present invention provides a process for treating the raw steam from a geothermal well during the drilling, flow testing, and reworking of the well to remove or abate the H$_2$S contained in the steam before it is released to the atmosphere.

The process of this invention has the following steps:
(a) contacting said raw steam containing H$_2$S gas with an aqueous solution having 1 to 6 moles of ferric chelate for each mole of H$_2$S in said steam, an effective amount of stabilizer and a pH in the range of 7 to 11 whereby H$_2$S is substantially completely absorbed and converted into sulfur solids and whereby a ferrous chelate solution is generated,
(b) separating said ferrous chelate solution from solids,
(c) converting said ferrous chelate solution with an oxygen containing gas stream into a ferric chelate solution,
(d) recycling said ferric chelate solution back to said contacting step for reuse.

BRIEF DESCRIPTION OF THE DRAWING

The Figure of the drawing shows a process wherein the exhaust air from the drilling operation and geothermal steam is conducted by a blooie line to a separator.

In the drawing, a pump 12 pumps air from line 10 into line 14 through the rotary table 16 and into the hollow drill string 20. The table 16 rotates the drill string 20 and the drill bit 22. The drill cuttings are removed from the well by a combination of the air stream and the geothermal steam. The combination of air and steam exits into a blooie line 24.

Figure 1:
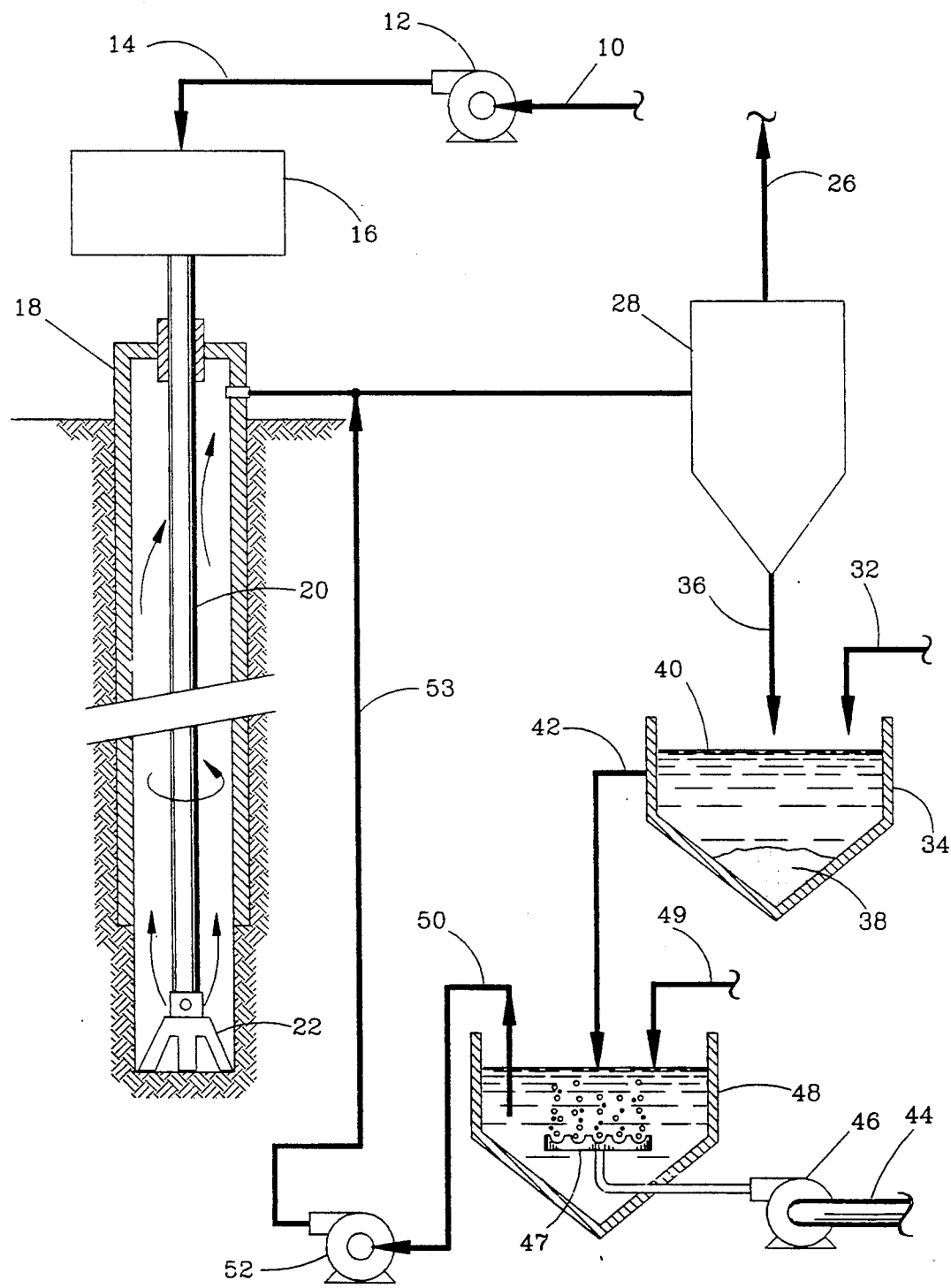

At the injection point 54, an aqueous solution of ferric chelate is injected into the blooie line 24. The position of the injection point is carefully chosen so as to make the distance from the injection point 54 to the separator 28 as great as possible. The distance can be shorter provided that adequate mixing is provided by one or more mixing devices such as a static mixer or an equivalent device. This is to insure that there will be adequate time for the H₂S to be absorbed by the solution of ferric chelate and for the resulting sulfide ions to be converted into free sulfur or sulfur solids by the oxidation reaction of the ferric chelate.

The blooie line 24 carries the H₂S, steam, air, liquids, debris, etc. into a cyclone separator 28 where the gases are exhausted into the atmosphere by line 26, and the sulfur solids, rock cuttings, and debris are removed by line 36 into a settling tank 34.

In the settling tank 34, the liquid level 40 is maintained above the outlet line 42 so that there is a constant flow of chelate solution from the settling tank 34 into the aeration tank 48. The entrained solids settle out at the bottom of the tank 34 in a sludge pile 38. Inlet line 32 is provided for the addition of ferric chelate solution as needed. If desired, the ferric chelate solution can also be added to tank 48. The same inlet line can be used for the addition of cationic polymeric catalysts and stabilizers as needed.

The aeration tank 48 is provided with a sparger 47 which is supplied with air by pump 46 and air inlet 44. Inlet line 49 is provided for the addition of a basic solution such as aqueous sodium hydroxide or sodium carbonate solution to adjust or control the pH of the chelate solution. The sparger 47 in tank 48 oxidizes the ferrous chelate to ferric chelate in a well known manner. If desired, the oxidation process can also be applied to settling tank 34 by the addition of a similar sparger operating from the same air pump 46.

The ferric chelate from aeration tank 48 is withdrawn by line 50 and pump 52 for injection into the blooie line 24 means of line 53.

DETAILED DESCRIPTION OF THE INVENTION

Chelating agents useful in preparing the ferric chelate of the present invention include those chelating or complexing agents which form a water-soluble chelate. Representative of such chelating agents are the amino carboxylic acids, such as nitrilotriacetic acid, N-hydroxyethyliminodiacetic acid, ethylenediaminetetraacetic acid, N-hydroxyethylethylenediaminetriacetic acid, diethyenetriaminepentaacetic acid, cyclohexanediaminetetraacetic acid, triethylenetetraaminehexaacetic acid and the like, including the salts thereof. Another useful chelating agent is lignosulfonate. Of such chelating agents, ethylenediaminetetraacetic acid, N-hydroxyethylethylenediaminetriacetic acid and N-hydroxy-ethyliminodiacetic acid, are most advantageously employed in preparing the ferric chelate used herein.

The chelated iron concentrations in the circulating solution should be in the range from 100 to 2000 ppm of iron and preferably in the range from 1,000 to 3,000 ppm.

Examples of useful cationic polymeric catalysts optionally used are polyethyleneamines, poly (2-hydroxy-propyl-1-N-methylammonium chloride), poly(2-hydroxy-propyl-1,1-N-dimethyl ammonium chloride), poly[N-(dimethylaminomethyl)]-acrylamide poly(2-vinylimidazolinium bisulfate), poly(diallyldimethyl ammonium chloride) and poly(N-dimethyl aminopropyl)-methacrylamide. With the exception of the polyethyleneamines, these cationic polymers typically have a molecular weight in excess of about 10,000. Such catalysts are well known and are commercially available under various tradenames. See, for example, *Commercial Organio Flocculants* by J. Vostrcil et al., Noyes Data Corp. (1972) which is incorporated by reference herein. Other useful cationic catalysts are set forth in *J. Macromol. Science--Chem.* A4, pp. 1327-1417 (1970) which is also incorporated by reference herein.

The foregoing catalysts are used in the circulating solution at a rate in the range from 25 to 3000 parts per million. A preferred range is 50 to 500 parts per million. The most preferred range is 150 to 300 parts per million. It is to be understood that the above ranges are considered to be effective amounts of the catalyst. The use of amounts less than the above ranges do not generally have the desired affect. The use of amounts more than the above ranges are not economical.

The stabilizer(s) used in this invention inhibit the oxidation of the iron chelate by hydroxyl radicals and other closely related oxygen species. Compounds having a higher affinity for hydroxyl radicals than the chelating agents stabilize the chelating agent solution by preferentially combining with the hydroxyl radicals. The relative effectiveness of such stabilizers depends upon the relative affinity for hydroxyl radicals, as well as the stability of the stabilizer in the iron chelate solution and the concentration of the stabilizer therein The stabilizer should generally have a hydroxyl reactivity rate constant of at least about $1 \times 10^9$ dm$^3$mol$^{-1}$s$^{-1}$ to be an effective inhibitor of iron chelate degradation by hydroxyl species. Exemplary stabilizers in the present process include iodide ions, bromide ions, nitrites, amino acids, aliphatic aldehydes, sugars, ascorbates, aryl sulfonic acids, combinations thereof, and the like.

In contrast to other halides, iodide($-1$) and bromide($-1$) ions have a relatively high hydroxyl reactivity rate and are therefore effective stabilizers in the present invention. In contrast to some prior art from which it is known to use bromide as an anion for the transition metal salt from which the chelate is prepared, as in U.S. Pat. No. 3,965,473, for example, the present invention employs the bromide (and/or iodide and/or another stabilizer) in a substantial excess of an equivalent amount relative to the iron chelate, preferably at least three equivalents, and especially at least seven equivalents. Bromide and iodide ions in the present process are also distinguished from trihalides($+1$) used in the prior art to take the place of the iron chelate used herein by contacting the H₂S to reduce the trihalide to zero valency and electrolytically oxidizing and regenerating the trihalide for reuse as in U.S. Pat. No. 4,220,505.

Similarly, some of the sugars used herein as stabilizers have also been used as iron chelating or complexing agents as described, for example, in U.S. Pat. Nos. 4,189,462 and 4,455,287. However, the sugars used herein are, likewise in contrast, employed in substantial excess of an equivalent of the chelated iron, preferably at least three such equivalents, and especially seven such equivalents.

Aliphatic aldehydes have been described, for example, in U.S. Pat. No. 4,083,945, as additives for water-soluble vanadates in the Stretford process to inhibit the formation of soluble sulfur species such as thiosulfates. In contrast thereto, however, it has been found that the aliphatic aldehydes may be used in the present process as effective iron chelate degradation inhibitors even under thiosulfate-forming conditions which are sometimes desirable, for example, in geothermal steam treatment where solid sulfur formation is disadvantageous.

Aryl sulfates such as benzenesulfonic acid have also been employed in the Stretford process as solubilizing agents for vanadium compounds, for example, as described in U.S. Pat. No. 4,243,648. However as far as applicant is aware, aryl sulfonates have not heretofore been employed as stabilizers in substantial excess of an equivalent weight with iron chelates which do not usually require a solubilizing agent.

The stabilizers are employed in the present process in substantial excess of an equivalent weight of the complexed iron, preferably at least three equivalent weights, and especially at least seven equivalent weights, and are generally effective in any concentration up to the limits of solubility, but economics usually dictate a molar ratio of stabilizer to iron up to about 100. The stabilizers may be used alone or in combination with two or more other stabilizers to obtain the desired effective concentration thereof in the chelating solution. Thus, the stabilizers may be selected from the groups consisting of: nitrites, amino acids, aliphatic aldehydes, sugars, ascorbates and aryl sulfonic acids; iodides, bromides, aliphatic aldehydes, sugars and aryl sulfonic acids; iodides, bromides, nitrites, amino acids, sugars and ascorbates; and like groups.

The circulation rate of the chelate solution depends upon the hydrogen sulfide level in the geothermal steam. In general, the circulation rate should be sufficient to provide 1 to 6 moles and preferably 2 to 4 moles of ferric chelate for every mole of $H_2S$ entering the reaction zone, i.e. the blooie line 24.

The contact time of the reactants should be at least 0.05 seconds or more and preferably in the range from 0.2 to 1.0 seconds.

The pH of the ferric chelate solution should be in the range from 7 to 11 and preferably in the range from 9.5 to 10.5. Below the pH level of 7, the $H_2S$ removal is inadequate and above the level of 11 the solution does not retain the ferric chelate in soluble form.

The entrained solids and debris from the well drilling are separated from the ferrous chelate solution in a separation zone. In general, a settling tank or vessel must be provided having a capacity such that there is a residence time of the chelate solution in the range from 0.1 to 5 hours and preferably in the range from 1 to 2 hours.

In the aeration or converting zone, air or an oxygen containing gas is sparged in at a rate to provide at least 0.5 mole of oxygen per mole of $H_2S$ being treated. In general, the ratio is from 0.6 to 20.0 moles of oxygen per mole of $H_2S$ and preferably the rate is 1.0 to 10.0 moles of oxygen per mole of $H_2S$.

EXAMPLE 1

A non-stabilized ferric chelate solution was prepared by mixing the following components:

| Item | Amount |
|---|---|
| Water | 1350 ml |
| Fe VERSENOL AG* | 150 ml |
| $Na_2B_4O_7 \cdot 10H_2O$ | 71.5 g |
| $K_2HBO_4$ | 65.3 g |

-continued

| Item | Amount |
|---|---|
| $KH_2PO_4$ | 51.0 g |

To this ferric chelate solution was added 0.75 moles of sodium benzoate as a stabilizer.

A gas mixture containing hydrogen sulfide was sparged through the stabilized ferric chelate solution for approximately twelve hours. The sparge gas consisted of air at 44 standard cubic feet per hour and of 5 percent hydrogen sulfide in nitrogen at 0.5 standard cubic feet per hour.

Following sparging, the ferric chelate solution was filtered and the filtrate quantitatively analyzed to determine the weight loss of VERSENOL. The filtered material was dried and quantitatively analyzed to determine the amount of sulfur recovered from the gas stream. Results are presented in a comparison Table for Example 3 below.

EXAMPLE 2

A non-stabilized ferric chelate solution was prepared as done for Example 1. To this solution was added 0.75 moles of paratoluene sulfonic acid and the solution was then sparged for twelve hours with the sparge gas of Example 1. Results are also presented in the comparison Table for Example 3 below.

EXAMPLE 3 (Comparison)

A non-stabilized ferric chelate solution was prepared as done for Example 1 and sparged for twelve hours with the sparge gas of Example 1 without the addition of a stabilizer. The following Table demonstrates the effectiveness of the stabilizers of Examples 1 and 2 in comparison to the non-stabilized ferric chelate solution.

| Example | Additive | VERSENOL Degraded Per Sulfur Produced grams/gram |
|---|---|---|
| 1 | Sodium Benzoate | 0.39 |
| 2 | Paratoluene Sulfonic Acid | 0.33 |
| 3 | None | 1.83 |

The preceding results demonstrate the effectiveness of soluble aromatic compounds for stabilization of metal chelate solutions. Although the run time of twelve hours is too short to quantitatively determine the benefit from conversion of the stabilizers to chelating agents, an analysis of the final sodium benzoate stabilized solution indicated the formation of salicylic acid and other hydroxylated benzoates. Such compounds would be effective chelating agents and should be formed in significant concentrations during the useful life of metal chelating solutions. Although not analyzed, the final paratoluene sulfonic acid stabilized solution is expected to have contained trace amounts of hydroxylated derivatives such as sulphonated cresols and methyl catechols which also should be effective chelating agents.

EXAMPLE 4

A non-stabilized ferric chelate solution was prepared as done for Example 1. To this solution was added 0.75 moles of potassium iodide followed by sparging for twelve hours with the sparge gas of Example 1. Results are presented in a comparison Table for Example 7 below.

EXAMPLE 5

A non-stabilized ferric chelate solution was prepared as for Example 1. To this solution was added 0.75 moles of potassium bromide followed by sparging for twelve hours with the sparge gas of Example 1. Results are presented in the comparison Table for Example 7 below.

EXAMPLE 6 (Comparison)

A non-stabilized ferric chelate solution was prepared as for Example 1. To this solution was added 0.75 moles of potassium chloride followed by sparging for twelve hours with the sparge gas of Example 1. In comparison to potassium iodide and potassium bromide, potassium chloride does not have a high affinity for hydroxyl radicals. Results are presented in the comparison Table for Example 7 below.

EXAMPLE 7 (Comparison)

A non-stabilized ferric chelate solution was prepared as for Example 1 and sparged for twelve hours with the sparge gas of Example 1 without the addition of a stabilizer. The results of Examples 4 through 7 are presented for comparison in the following Table.

| Example | Additive | VERSENOL Degraded Per Sulfur Produced, Grams/Gram |
|---------|----------|---------------------------------------------------|
| 4 | KI | 0.51 |
| 5 | KBr | 0.43 |
| 6 | KCl | 1.72 |
| 7 | None | 1.83 |

The preceding results demonstrate the effectiveness of bromide and iodide ions as stabilizers for metal chelate solutions. The chloride ions, which do not have a high affinity for hydroxyl radicals, provided little stabilization.

EXAMPLE 8

A non-stabilized ferric chelate solution was prepared as for Example 1. To this solution was added 0.38 moles of sucrose followed by sparging for twelve hours with the sparge gas of Example 1. Results are presented in the following comparison Table which compares the results for Example 8 with the results of the non-stabilized solution of Example 7.

| Example | Additive | VERSENOL Degraded Per Sulphur Produced, Grams/Gram |
|---------|----------|----------------------------------------------------|
| 7 | None | 1.83 |
| 8 | Sucrose | 0.94 |

These results demonstrate the effectiveness of sugars as stabilizers for metal ohelate solutions.

All of the preceding Examples demonstrate that compounds having a high affinity for hydroxyl radicals are effective stabilizers for metal chelate solutions. Preferred compounds can be selected based upon solubilities, costs and relative effectiveness.

The foregoing description of the invention is illustrative and explanatory thereof. Various modifications will become apparent to those skilled in the art in view of the present disclosure. It is intended that all such variations which fall within the scope and spirit of the appended claims be embraced thereby.

What is claimed is:

1. A method for removing hydrogen sulfide from a gas stream, comprising:
    contacting a gas containing hydrogen sulfide with an aqueous chelating solution to form elemental sulfur, said solution comprising:
    (i) ferric ions in a concentration of at least about 100 ppm;
    (ii) an aminocarboxylic acid chelating agent in an amount of at least an equivalent weight relative to said ferric ions;
    (iii) a buffering compound for maintaining a pH between about 4 and about 11; and
    (iv) a water-soluble inhibitor having a hydroxyl reaction rate constant of at least about $1 \times 10^9$ $dm^3 mol^{-1} s^{-1}$ effective as a hydroxyl radical scavenger in an amount substantially in excess of an equivalent weight relative to said ferric ions, said inhibitor selected from the group consisting of iodide and bromide ions, nitrites, amino acids, aliphatic aldehydes, aryl sulfonic acids, and combinations thereof;
    wherein at least a portion of said ferric ions are reduced to ferrous ions;
    removing said sulfur from said solution; and
    oxidizing the ferric ions to regenerate the solution for reuse.

2. The method of claim 1, wherein the gas is essentially free of said inhibitor.

3. The method of claim 1, wherein the inhibitor is present in an amount of at least three equivalent weights relative to said ferric ions.

4. The method of claim 1, wherein the inhibitor is present in an amount of at least seven equivalent weights relative to said ferric ions.

5. The method of claim 1, wherein said gas comprises geothermal steam.

6. The method of claim 1, wherein said solution contains a cationic polyelectrolyte for catalyzing said elemental sulfur formation.

7. The method of claim 6, wherein said polyelectrolyte is present in said solution at from 25 to 3000 ppm.

8. A process for treating raw steam from a geothermal well to remove $H_2S$ therefrom comprising:
    (a) contacting the raw steam with an aqueous solution having 1 to 6 moles of ferric chelate for each mole of $H_2S$ in the stream at a pH in the range of 7 to 11 in a first reaction zone to substantially completely absorb and convert the $H_2S$ to sulfur solids and to generate a ferrous chelate solution, wherein the ferric chelate solution includes a water soluble stabilizer having a hydroxyl reaction rate constant of at least about $1 \times 10^9 \, dm^3 mol^{-1} s^{-1}$ effective as a hydroxyl radical scavenger in an amount in excess of an equivalent weight relative to said ferric ions, said stabilizer selected from iodide($-1$) ion, bromide($-1$) ion, nitrites, amino acids, aliphatic aldehydes, and aryl sulfonic acids;
    (b) separating said ferrous chelate solution from said solids;
    (c) contacting said ferrous chelate solution in a second reaction zone with an oxygen-containing gas to oxidize said ferrous chelate to form a regenerated ferric chelate solution; and (d) recirculating said ferric chelate solution back to said first reaction zone.

9. The process of claim 8, wherein said first reaction zone is in a blooie line from the geothermal well.

10. The process of claim 9, wherein the raw steam is produced during drilling, flow testing or reworking of the geothermal well.

11. The process of claim 8, wherein the ferric chelating solution contains from 0 up to 3000 ppm of a cationic polymeric catalyst for accelerating said solid sulfur formation.

12. The process of claim 8, wherein the stabilizer includes iodide ion.

13. The process of claim 8, wherein the stabilizer includes bromide ion.

14. The process of claim 8, wherein the stabilizer includes a nitrite.

15. The process of claim 8, wherein the stabilizer includes an amino acid.

16. The process of claim 8, wherein the stabilizer includes an aliphatic aldehyde.

17. The process of claim 8, wherein the stabilizer includes an aryl sulfonic acid.

18. A stabilized aqueous chelating solution for hydrogen sulfide abatement, comprising:

aqueous ferric aminocarboxylic acid chelate in an amount providing a ferric ion concentration of at least 100 ppm;

a buffering compound sufficient to maintain a pH of about 4-11; and an inhibitor having a hydroxyl reaction rate constant of at least about $1 \times 10^9 \, dm^3 mol^{-1} s^{-1}$ effective as a hydroxyl radical scavenger in at least an equivalent amount relative to said ferric ions, said inhibitor selected from the group consisting of: iodide and bromide ions, nitrites, amino acids, aliphatic aldehydes, aryl sulfonic acids, and combinations thereof.

19. The chelating solution of claim 18, wherein at least three equivalents of said inhibitor are present.

20. The chelating solution of claim 18, wherein at least seven equivalents of said inhibitor are present.

21. The chelating solution of claim 18, wherein the inhibitor includes iodide.

22. The chelating solution of claim 18, wherein the inhibitor includes bromide.

23. The chelating solution of claim 18, wherein the inhibitor includes nitrite.

24. The chelating solution of claim 18, wherein the inhibitor includes amino acid.

25. The chelating solution of claim 18, wherein the inhibitor includes aliphatic aldehyde.

26. The chelating solution of claim 18, wherein the inhibitor includes aryl sulfonic acid.

27. The chelating solution of claim 18, further comprising a cationic polyelectrolyte catalyst.

28. The chelating solution of claim 27, wherein the polyelectrolyte concentration is from 25 to 3000 ppm.

29. The chelating solution of claim 27, wherein the polyelectrolyte concentration is from 100 to 2000 ppm.

30. The chelating solution of claim 27, wherein the polyelectrolyte concentration is from 1000 to 3000 ppm.

31. The chelating solution of claim 27, wherein the polyelectrolyte is selected from polyethyleneamines, poly (2-hydroxypropyl-1-N-methylammonium chloride), poly(2-hydroxypropyl-1,1-N-dimethyl ammonium chloride), poly-acrylamide, poly(2-vinylimidazolinum bisulfate), poly(diallyldimethyl ammonium chloride) and poly(N-dimethyl aminopropyl)-methacrylamide.

32. The chelating solution of claim 27, wherein the polyelectrolyte is poly(diallyldimethylammonium chloride.

* * * * *